Patented Mar. 13, 1934

1,950,935

UNITED STATES PATENT OFFICE 1,950,935

FOOD

William R. Thomas, Los Angeles, Calif.

No Drawing. Application April 1, 1930,
Serial No. 440,868

7 Claims. (Cl. 99—11)

This invention relates to a food, and it is a general object of the invention to provide a composition for making a palatable, nutritious, and inexpensive dish in the nature of a salad.

Various ingredients are used in the making of salads, some of the most common being fruits and vegetables. For example, a popular salad is made from chopped vegetables and gelatine. Dishes of this character, to be made most pleasing, require a variety of vegetables and a proper blending of vegetables. For these reasons salads of this type are rather difficult and inconvenient to prepare.

It is a general object of this invention to provide a prepared composition from which a palatable and nutritious salad can be easily and quickly made.

An object of the invention is to provide a dry non-perishable composition of the general character mentioned containing vegetables in such form that they occur in the salad prepared from the composition to taste and appear like fresh or newly-grown vegetables.

Another object of the invention is to provide a composition of the character mentioned in which the ingredients are in condensed form and are dry so that the composition can be handled economically and will keep indefinitely.

A further object of the invention is to provide a composition of the character mentioned from which a finished salad can be prepared by the simple addition of water.

It is a further object of this invention to provide a composition of the character mentioned including dehydrated vegetables, a carrier for the vegetables such as gelatine, and flavoring. The composition provided by this invention is proportioned and flavored so that the salad when prepared appears and tastes like a salad prepared from fresh or newly-grown products.

Another object of the invention is to provide a composition of the character mentioned in which the vegetables are in the nature of flakes or particles of vegetables that are dehydrated but not destroyed or broken in their cellular structure.

The various objects and features of the present invention will be best and more fully understood from the following detailed description of a typical form thereof, particular reference being made to a composition for making vegetable salad.

The composition provided by this invention includes, generally, dehydrated vegetable matter, a carrier such as gelatine, sugar, flavoring, salt, and fruit acid.

The vegetable matter present in the composition is dehydrated, and is preferably in the form of flakes, the flakes being of such size or proportions as to cause the vegetables in the salad to be recognizable and of a size such as is ordinarily employed in dishes of this character. I employ vegetables that have been chopped or otherwise divided into pieces of the desired size and then dehydrated without destroying the cellular structure or removing anything except moisture. In practice I have found it advantageous to use a combination of vegetables including celery, carrot, pimento, tomato, cabbage, parsley, and chili, the proportioning of the various vegetables being such as to gain the desired balance or flavor in the salad. It is ordinarily desirable to have a predominating amount of celery and carrot.

The carrier employed is preferably gelatine and in practice may be gelatine such as is ordinarily employed in food products. A suitable amount of sugar is added to the composition and thoroughly mixed with the gelatine. In fact, the sugar may be embodied in the gelatine in the course of its manufacture.

Suitable flavoring, preferably lemon, is incorported in the composition and, like the sugar, may be embodied in the gelatine. Further, a suitable amount of salt and a small amount of fruit acid are embodied in the composition.

The proportioning of the various ingredients, like the proportioning of the vegetables, may be varied, it being preferred ordinarily to proportion the ingredients about as follows: ten parts (by weight) of dehydrated vegetable flakes; thirty parts of gelatine; two parts of salt, and one part of fruit acid. The sugar and flavoring may be included in the gelatine and may be in such quantities as to give the finished salad the desired flavor. The composition which I have described is, of course, dry and is in the nature of a concentrated product which can be easily and economically marketed.

To prepare a salad from the product or composition that I have provided, the composition is placed in a suitable container, such as a dish, and a suitable quantity of boiling water is added to it. The mixture is then stirred until the soluble ingredients such as the sugar, gelatine, flavoring, etc., are dissolved, this usually taking about two or three minutes. The mixture is then cooled as by placing it in a refrigerator, or the like. It is preferred to stir the mixture or agitate it as the gelatine stiffens, so that the particles of vegetable are more or less uniformly distributed throughout the mass. The boiling water added to the composition not only dissolves the gelatine and other soluble ingredients, but is taken up by the dehydrated vegetable flakes so that the flakes are restored to their original size and shape with the result that they take on the appearance and other characteristics of fresh vegetables. By employing dehydrated vegetable flakes in which the cellular structure has not been destroyed, the vegetables when subjected to gelatine solution return to their original form and have the firmness and crispness of fresh vegetables. The time required for the water to cool and the gelatine to set gives the vegetable flakes time in which to absorb enough water containing the dissolved gelatine so that they are completely swelled or restored to their original size by the time the salad is set.

The salad thus prepared from the composition is not only palatable and nutritious, but possesses the characteristics of a dish prepared from fresh or newly-grown products. The pieces of vegetables occurring in the salad have the color, flavor, and physical characteristics of fresh vegetables and, in being properly blended or proportioned, result in a salad superior to that prepared under ordinary conditions.

From the foregoing description it will be apparent that the composition can be varied considerably without departing from the spirit of the invention. For instance, dehydrated fruits may be added to or used in place of vegetables to vary the nature of the salad. Further, it will be obvious that considerable variation may be made in the minor ingredients such as the flavoring, fruit acid, etc., without departing from the broader principles of the invention.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A composition of the character described to be mixed with water including dry, gelatine and dehydrated liquid absorbent vegetable flakes.

2. A dry composition of the character described to be mixed with water including, gelatine, flavoring, and dehydrated liquid absorbent vegetable flakes.

3. A dry composition of the character described to be mixed with water including, gelatine, flavoring, fruit acid, and dehydrated liquid absorbent vegetable flakes.

4. A dry composition of the character described to be mixed with water including, gelatine, and dehydrated liquid absorbent vegetable flakes, including, principally, celery and carrots.

5. A composition of the character described normally in a dry state and intended to be mixed with water which includes, gelatine, and dehydrated liquid absorbent vegetable flakes including, celery, carrots, pimento, tomato, cabbage, parsley, and chili.

6. A dry composition of the character described to be mixed with water including, gelatine, sugar, flavoring, salt, fruit acid, and dehydrated liquid absorbent vegetable flakes.

7. A dry composition of the character described to be mixed with water including, gelatine and dehydrated liquid absorbent vegetable flakes having unbroken cellular structures.

WILLIAM R. THOMAS.